No. 873,321. PATENTED DEC. 10, 1907.
F. LYON.
SPEED RECORDER AND INDICATOR.
APPLICATION FILED DEC. 29, 1905.
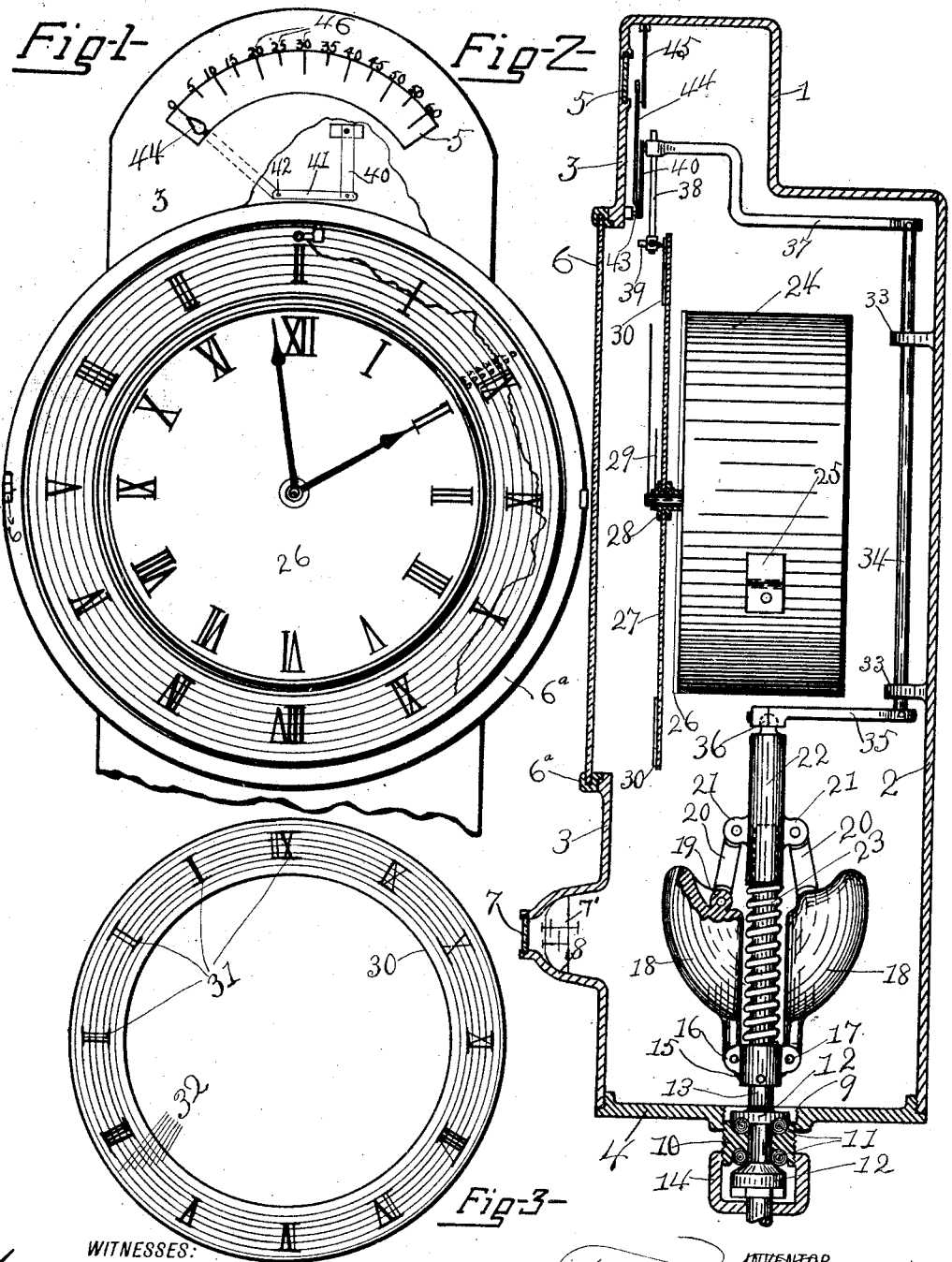

UNITED STATES PATENT OFFICE.

FRED LYON, OF ITHACA, NEW YORK, ASSIGNOR OF ONE-HALF TO EDWARD E. INGALLS, OF ITHACA, NEW YORK.

SPEED RECORDER AND INDICATOR.

No. 873,321.      Specification of Letters Patent.      Patented Dec. 10, 1907.

Application filed December 29, 1905. Serial No. 293,703.

*To all whom it may concern:*

Be it known that FRED LYON, a citizen of the United States, residing at Ithaca, in the county of Tompkins and State of New York, has invented certain new and useful Improvements in Speed Recorders and Indicators for Automobiles, of which the following is a specification.

This invention relates to new and useful improvements in speed recorders and indicators for automobiles.

The structure contemplated relates particularly to a construction of that type wherein a permanent record day by day is traced, the details of the invention being such that the record is traced to show the speed at any hour or minute of the day.

It is a primary object of the present invention to provide in conjunction with the speed recording apparatus, a visual speed indicating apparatus which may be read at a glance and which is driven by the same motor and with the same impulses as the recording apparatus.

It is a further object of my invention to provide in connection with the various operating elements, a removable chart, designed for one day's work, whereby the records for weeks or months at a time as may be desired may be preserved. This arrangement is especially advantageous to tourists, who in rapidly driving through a village are liable to fines for exceeding the speed limits, as the permanent record made by the apparatus embodying the present invention shows the exact speed at which the machine was running at the time it was judged that the speed limits were exceeded, and may be submitted as evidence to contravene guess-work testimony of spectators.

The detailed construction will appear in the course of the following description, in which reference is had to the accompanying drawings forming a part of this specification, like numerals designating like parts throughout the several views, in which:

Figure 1 is a front elevation showing the arrangement of the record chart and indicator, the lower part of the apparatus being broken away; Fig. 2 is a longitudinal section thereof, and Fig. 3 is an elevation of the record chart.

Referring specifically to the accompanying drawings, the numeral 1 designates a casing which is employed to contain the constituent elements of the apparatus and is formed with a rear wall 2, a front wall 3, and a removable bottom plate 4. The front wall 3 is provided with a number of openings, of which three are preferably employed. These openings are closed by sheets of glass or other transparent material, and are arranged one above the other, the top opening 5, being arc-shape and permitting of the reading of the indicator therethrough, the central opening 6, being circular, and permitting of the reading of the record chart therethrough, and the lowermost opening 7, being designed for the reading of a cyclometer 71, the mechanism of which is located in an enlarged portion 8, of the front wall 3. The provision of a cyclometer does not constitute any part of the present invention, as the operating mechanism therefor is independent of the rest of the apparatus, and it is merely employed for the sake of convenience in maintaining a complete record at all times. The transparent sheet 6 which closes the central opening is secured in a frame 6$^a$ hinged to the front wall 3 as at 6$^b$, in the usual manner of the door of a clock, whereby upon opening said frame 6$^a$ access may be had to the interior of the casing, for the purpose of making changes or repairs.

The bottom plate 4, is provided with a central opening 9, which is threaded to receive an apertured bushing 10, which is provided upon its top and bottom surfaces with runways to receive ball-bearings 11, interposed between said surfaces and between spaced peripheral flanges 12, formed upon a shaft 13, extending through said buhsing 10, and operatively connected to and driven by the hub of the wheel.

In order to protect the bearings from dust I have secured upon the bushing 10, a cap or guard 14, formed with a central opening through which the shaft 13 passes. Rigidly secured to said shaft 13, within the casing 1, and adjacent to the bottom plate 4, is a collar 15, which is formed on opposite sides with spaced apertured lugs 16, arranged in pairs, between which are fulcrumed as at 17, the reduced ends of governor-weights 18, which are provided upon their upper portions with ears 19, to which one of the ends of links 20, are fulcrumed, the other ends of said links being fulcrumed to ears 21, arranged in pairs on each side of a rod 22, which is formed with a hollow lower portion which fits over the top of the shaft 13, in a sleeved relation. An expansive spiral-spring 23, is interposed between the shaft 13, in a sleeved relation between the collar 15 and the rod 22.

In approximately the central portion of the casing 1, a clock mechanism is mounted in a suitable housing 24, which is supported from the sides of said casing by brackets 25. Mounted upon the face of the housing 24, is a dial-plate 26. A disk-shaped plate 27 is rigidly mounted upon the arbor 28, to which the hour-hand 29 is secured. The plate 27 is made of some thin transparent material such as mica, and moves upon the arbor 28 with the hour-hand 29. Said plate 27 is of greater diameter than the casing 24, and so overlies the same for an equal distance at all points along its periphery. Mounted adjacent to the periphery of the plate 27, is a chart 30, of annual configuration, which is removably secured to said plate in any suitable manner. The chart 30 is provided with the numerals upon the dial of the clock, but said numerals are arranged in reverse order, so as to read backwards, as indicated at 31. The chart 30 is formed upon its face with a series of annual concentric lines or markings 32, which serve as a scale for recording the varying degrees of speed at which the machine is traveling through connected mechanisms to be described.

The rear wall 2, of the casing 1, is formed with laterally extending brackets 33, arranged in spaced superposed relation and in axial alinement which serve as guides for a vertical rod 34, having connection at its lower end with a horizontal arm 35, universally mounted as at 36, upon the end of the rod 22. The upper end of the rod 34 has rigid connection with a horizontal arm 37, which follows in its contour the general contour of the upper wall of the casing 1. The free end of the arm 37, is apertured to receive a marker 38, which carries at its lower end a removable pencil 39, overlying and bearing against the chart 30, secured to the disk 27.

To the free end of the arm 37 is fulcrumed one end of a vertically-extending link 40, the other end of which is fulcrumed to a horizontal link 41, which has rigid connection as at 42 with a pintle 43, journaled in the front wall 3, of the casing 1. An indicator hand 44, is also rigidly mounted upon the pintle 43, so as to move therewith. The indicator hand 44 overlies a plate 45, depending from the top of the casing 1, the plate 45, being provided with a scale as at 46, which is arranged in the shape of an arc of a circle. The link connections 40 and 41 are shown in Fig. 1, the front wall 3, being broken away for the purpose of illustration.

In operation the shaft 13 is driven from the hub of the vehicle, and in accordance with its speed the governor weights 18, mounted thereupon in the usual manner, will be thrown outwardly, the greater the degree of speed the greater the degree of outward movement of said weights. As said weights 18 are thrown outwardly, corresponding downward movement will be imparted to the rod 22, through the link connections 20, and as said rod 22 moves downwardly, corresponding downward movement will be imparted to the rod 34, connected therewith by the arm 35, and in turn to the marker 38, secured to the arm 37 mounted upon the upper end of the rod 34. It will be seen that as the chart 30 moves with the hour hand, the speed at which the machine is traveling at any particular time, will always be recorded by the relation of the mark of the pencil 39, to the scale upon the chart 30, and the particular time at which such speed was maintained, will be found in the relation of the mark traced to the space between the hour divisions.

As shown in Fig. 1, the scale 32, has lines, which register the miles in decimal order, starting with "0" and extending to "60". Hence in reading the mark traced upon the figure, it will be seen that the machine was started at about twenty minutes after 9, that at 10 o'clock it was making thirty miles an hour, that at about half-past twelve it stopped, and was started again very shortly, and stopped again at two.

The indicating mechanism is operated by the rod 34, and the rod 37 with the same impulses by which the recording mechanism is operated. When the rod 34 moves downwardly, such movement will be imparted to the link 40, and through connecting link 41, the pintle 43 will be revolved, and carrying therewith the indicator hand 44, which moves along the scale 46, and constantly indicates the speed at which the machine is traveling.

Inasmuch as the disk 27 carrying the chart 30 travels with the hour hand, said chart will make one revolution in twelve hours, at which time the record for the day will be complete. The chart 30 is then removed and a new chart substituted, when another day's record is commenced.

Having fully described my invention, I claim:

1. In a device of the class described, the combination with a clock including a dial, of a transparent record carrier disposed in front of said dial and rotative therewith and through which the characters on the dial are visible and provided with a record ring.

2. In a device of the class described, the combination with a clock including a dial, the hands and their arbors, of a transparent record carrier between said dial and hands and through which the configuration of the dial is visible, and a record ring upon the carrier and concentric with the dial and beyond the same.

3. In a device of the class described, the combination with a clock including a dial, of a transparent record carrier disposed in front of said dial and rotative therewith and through which the configuration of the same is visible and provided with a record ring, a speed indicating device, a pencil operative over said record ring, and connecting means between said pencil and speed indicating device.

4. In a device of the class described, the combination with a clock including a dial and its hand and hand arbors, of a transparent record carrier between said dial and hands and through which the configuration of the dial is visible, a record ring upon the carrier and concentric with the dial, speed indicating devices, a pencil operative over said record ring, and connecting means between said pencil and speed indicating devices.

In testimony whereof I affix my signature in presence of two witnesses.

FRED LYON.

Witnesses:
 EDWARD E. INGALLS,
 T. K. BRYANT.